United States Patent
Ansari et al.

(10) Patent No.: US 11,961,310 B2
(45) Date of Patent: Apr. 16, 2024

(54) SYSTEM AND CRYPTOGRAPHIC HARDENING METHOD FOR TRAFFIC SIGNAL VERIFICATION

(71) Applicant: Harman International Industries, Incorporated, Stamford, CT (US)

(72) Inventors: Asadullah Ansari, Bangalore (IN); Sharath Yadav Doddamane Hemantharaja, Chitradurga (IN); Jipin Jose, Bangalore (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 419 days.

(21) Appl. No.: 17/594,597

(22) PCT Filed: Apr. 24, 2019

(86) PCT No.: PCT/IB2019/053357
§ 371 (c)(1),
(2) Date: Oct. 22, 2021

(87) PCT Pub. No.: WO2020/217087
PCT Pub. Date: Oct. 29, 2020

(65) Prior Publication Data
US 2022/0207885 A1    Jun. 30, 2022

(51) Int. Cl.
*G06V 20/58* (2022.01)
*G08G 1/0962* (2006.01)
(Continued)

(52) U.S. Cl.
CPC ....... *G06V 20/582* (2022.01); *G08G 1/09623* (2013.01); *G08G 1/096766* (2013.01);
(Continued)

(58) Field of Classification Search
None
See application file for complete search history.

(56) References Cited

U.S. PATENT DOCUMENTS

| 10,846,545 B2 | 11/2020 | Zinner et al. |
| 2014/0172287 A1 | 6/2014 | Ando et al. |

(Continued)

FOREIGN PATENT DOCUMENTS

| CN | 1574700 A | 2/2005 |
| CN | 1841411 A | 10/2006 |

(Continued)

OTHER PUBLICATIONS

ISA European Patent Office, International Search Report and Written Opinion Issued in Application No. PCT/IB2019/053357, dated Feb. 14, 2020, WIPO, 15 pages.

*Primary Examiner* — Dov Popovici
(74) *Attorney, Agent, or Firm* — McCoy Russell LLP

(57) ABSTRACT

Examples are provided for traffic sign detection systems. In one example, a traffic detection system in a vehicle includes an image sensor, a communication system, a processor, and a storage device storing instructions executable by the processor to capture an image of an environment of the vehicle via the image sensor, process the image to detect visual information regarding a traffic sign in the image, the visual information indicating a recognized sign, receive cryptographic data via the communication system from a transmitter associated with the traffic sign, the cryptographic data including a cryptographic representation of a traffic sign signal for controlling the traffic sign, and selectively control one or more vehicle systems of the vehicle based on a cryptographic verification of the recognized sign using the cryptographic data.

20 Claims, 7 Drawing Sheets

(51) Int. Cl.
*G08G 1/0967* (2006.01)
*H04L 9/08* (2006.01)
*H04L 9/14* (2006.01)

(52) U.S. Cl.
CPC .............. *H04L 9/0825* (2013.01); *H04L 9/14* (2013.01); *H04L 2209/80* (2013.01); *H04L 2209/84* (2013.01)

(56) References Cited

U.S. PATENT DOCUMENTS

| | | | | |
|---|---|---|---|---|
| 2018/0158329 A1* | 6/2018 | Benhammou | ............ | G08G 1/07 |
| 2019/0279007 A1* | 9/2019 | Zinner | ................ | G08G 1/09623 |
| 2023/0267834 A1* | 8/2023 | Ansari | ..................... | H04L 9/30 |
| | | | | 701/2 |
| 2023/0343108 A1* | 10/2023 | Hemantharaja | ........ | G06V 10/82 |

FOREIGN PATENT DOCUMENTS

| | | | |
|---|---|---|---|
| CN | 1933396 | A | 3/2007 |
| CN | 106059760 | A | 10/2016 |
| CN | 108881966 | A | 11/2018 |
| CN | 109154980 | A | 1/2019 |
| DE | 102016208621 | A1 | 11/2017 |
| WO | 2014051417 | A1 | 4/2014 |
| WO | 2016002276 | A1 | 1/2016 |

* cited by examiner

SYSTEM AND CRYPTOGRAPHIC HARDENING METHOD FOR TRAFFIC SIGNAL VERIFICATION

CROSS REFERENCES TO RELATED APPLICATIONS

The present application is a U.S. National Phase of International Patent Application Serial No. PCT/IB2019/053357 entitled "SYSTEM AND CRYPTOGRAPHIC HARDENING METHOD FOR TRAFFIC SIGNAL VERIFICATION", and filed on Apr. 24, 2019. The entire contents of the above-listed application are hereby incorporated by reference for all purposes.

FIELD

The disclosure relates to traffic signal and/or sign verification in vehicles, including the use of computer vision systems and cryptographic data transmission.

BACKGROUND

Intelligent transportation systems (ITS), a component of the ongoing evolution of smart cities, may be used in decision making in traffic planning and traffic management. Cars, traffic lights, drivers, sensors, roadside units, and other public infrastructures form a complex networked system of systems. ITS-based applications may include optimal traffic signal control, safe intersection crossing, and emergency warning notifications, with the goals of enhancing travel efficiency, public safety, emergency response, and even disaster recovery. As the building blocks of an ITS, smart traffic lights, signals, and/or signs are increasingly used in traffic management. Some vehicles, such as autonomous or semi-autonomous vehicles, may utilize imaging systems to detect traffic lights, signals, and/or signs and adjust vehicle operation accordingly.

SUMMARY

The disclosure provides mechanisms for performing real-time detection and recognition of traffic lights, signals, and/or signs with robust authentication and verification of detected data to address data security. For example, some traffic sign recognition systems may employ numerous deep learning algorithms to understand the different traffic signs under various image recognition scenarios. However, a challenge for the computer vision based traffic sign recognition systems, recognized by the inventors, is the ability distinguish the original traffic sign signals from fake or hacked ones, which are almost similar to legitimate traffic signals but are actually intended for some other applications and/or result from modification by an unauthorized entity (e.g., displayed by hacking existing traffic signal control systems). Prior algorithms also have challenges in distinguishing between the fake sign signals and original traffic sign signals. In some examples, aspects of the disclosure provide for a cryptography based traffic sign verification system that supplements computer vision-based traffic sign recognition. In some of the disclosed systems, data indicating a traffic sign is secured (e.g., encrypted and/or digitally signed) and transmitted to a vehicle. The vehicle verifies the secured data using a recognized sign from a computer vision system in order to check the authenticity of the computer vision-based recognized sign using cryptographic authentication.

In one example of a traffic sign identification system, the system includes an image sensor, a communication system, a processor, and a storage device storing instructions executable by the processor to capture an image of an environment of the vehicle via the image sensor, process the image to detect visual information regarding a traffic sign in the image, the visual information indicating a recognized sign, receive cryptographic data via the communication system from a transmitter associated with the traffic sign, the cryptographic data including a cryptographic representation of a traffic sign signal for controlling the traffic sign, and selectively control one or more vehicle systems of the vehicle based on a cryptographic verification of the recognized sign using the cryptographic data.

In an example of a method of verifying traffic signs with a vehicle, the method includes capturing an image of an environment of the vehicle via an image sensor, processing the image to detect visual information regarding a traffic sign in the image, the visual information indicating a recognized sign, receiving cryptographic data via the communication system from a transmitter associated with the traffic sign, the cryptographic data including a cryptographic representation of an authorized sign output associated with the traffic sign, and selectively controlling one or more vehicle systems of the vehicle based on a cryptographic verification of the recognized sign using the cryptographic data.

An example of a method of verifying external informational images in a vehicle's environment includes analyzing an external informational image including electronically displayed information received at the vehicle to identify the electronically displayed information from a display source and generate a characteristic field, comparing the characteristic field to cryptographic data received at the vehicle from the display source, and selectively controlling one or more vehicle systems of the vehicle based on the comparison.

BRIEF DESCRIPTION OF THE DRAWINGS

The disclosure may be better understood from reading the following description of non-limiting embodiments, with reference to the attached drawings, wherein below.

DETAILED DESCRIPTION

Some object recognition systems may utilize machine learning to increase accuracy in computer vision-based object recognition. However, existing object recognition systems have not sufficiently addressed various issues related to information and data security of traffic information, including, for example, an issue related to the advancements in the connectivity of traffic systems and traffic signals. Hacker or other cyber-attacks on traffic signal systems at the software level or at the wireless interception level may attempt to modify the traffic signals (used by autonomous or semi-autonomous vehicles, or simply used by vehicle operators or occupants), and which may also be displayed on a traffic sign display screen in the vehicle. Computer vision-based object recognition systems may be unaware of and susceptible to such vulnerabilities in the traffic signal control system, and may focus solely or primarily on performing image processing operations on the obtained images. Any changes in the traffic signal control system that are enacted to change the sign on the display-board of a traffic sign are not visible to other object recognition systems in the vehicles. Without mechanisms to verify the legitimacy of the incoming traffic signals, non-traffic/illegitimate traffic sign signals may infiltrate into the traffic sign recognition systems, which may cause the operators to take incorrect action and which may cause vehicles to operate incorrectly and/or outside of intended traffic rules.

Figure 1:
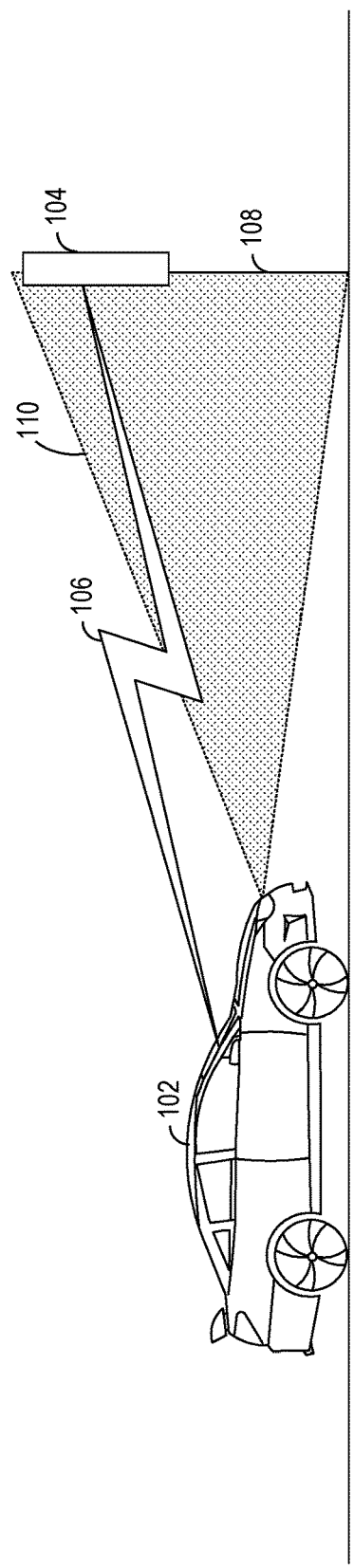
FIG. 1 schematically shows an example environment in which traffic sign detection and verification may be performed in accordance with one or more embodiments of the present disclosure.

The disclosure addresses, at least partially, one or more of the above issues in object recognition systems by expanding traffic sign detection systems to utilize secured communications of traffic signals for verification purposes. For example, FIG. 1 shows an example environment 100 for performing secured traffic sign detection between a vehicle 102 and a traffic sign 104 (as used herein, the term "traffic sign" may be used to denote a traffic signal, a traffic light, a traffic sign, and/or any other indicator that may be used in a traffic scenario to control and/or inform vehicles and/or operators on a roadway of a traffic regulation, ordinance, warning, instruction, etc.).

A traffic sign detection system may include a transceiver, where a transmitter is housed in the traffic sign 104 and/or accessible by the traffic sign 104. The transmitter may emit digital cryptographic information (represented by a transmission signal 106) using an antenna which is mounted on a traffic signal pole 108 and/or otherwise mounted on or near the traffic sign 104, and a vehicle receiver receives the digital information using an antenna which is mounted on the vehicle. The digital transmitted information may be the cryptographic representation of the corresponding traffic sign 104 which is displayed on an associated traffic signal display. The cryptographic representation distinguishes the one traffic sign from another using a unique ID which is assigned to each traffic signs separately. In a non-limiting example, when a STOP sign is displayed on the traffic display of traffic sign 104, then the transmitter transmits the cryptographic representation of the unique ID which is assigned to STOP sign.

The received cryptographic representation of the traffic sign which is transmitted using the transmitter is received at the vehicle 102 and the cryptographic information is verified inside a vehicular infotainment system/vehicular processor of the vehicle 102. The verification may include verifying the traffic sign recognized by a computer vision system of the vehicle using the received cryptographic representation. For example, the vehicle 102 may include one or more cameras that are configured to image a region of an environment around the vehicle (e.g., represented by a field of view 110), where the resulting images are processed to locate traffic signs in the imaged data. Any traffic signs recognized in the imaged data may be used with received cryptographic data in order to verify and/or authenticate a computer vision-recognized traffic sign. Using the above non-limiting example, if the computer vision-based traffic recognition in the vehicle 102 recognizes the traffic sign 104 as a STOP sign, then the vehicle performs a cryptographic authentication of the received signal using information for a STOP ID associated with the computer vision recognized STOP sign. If the cryptographic authentication using the STOP ID is successful, the traffic sign is considered as an authenticated one, otherwise the traffic sign is considered as a fake/false signal.

Figure 2:
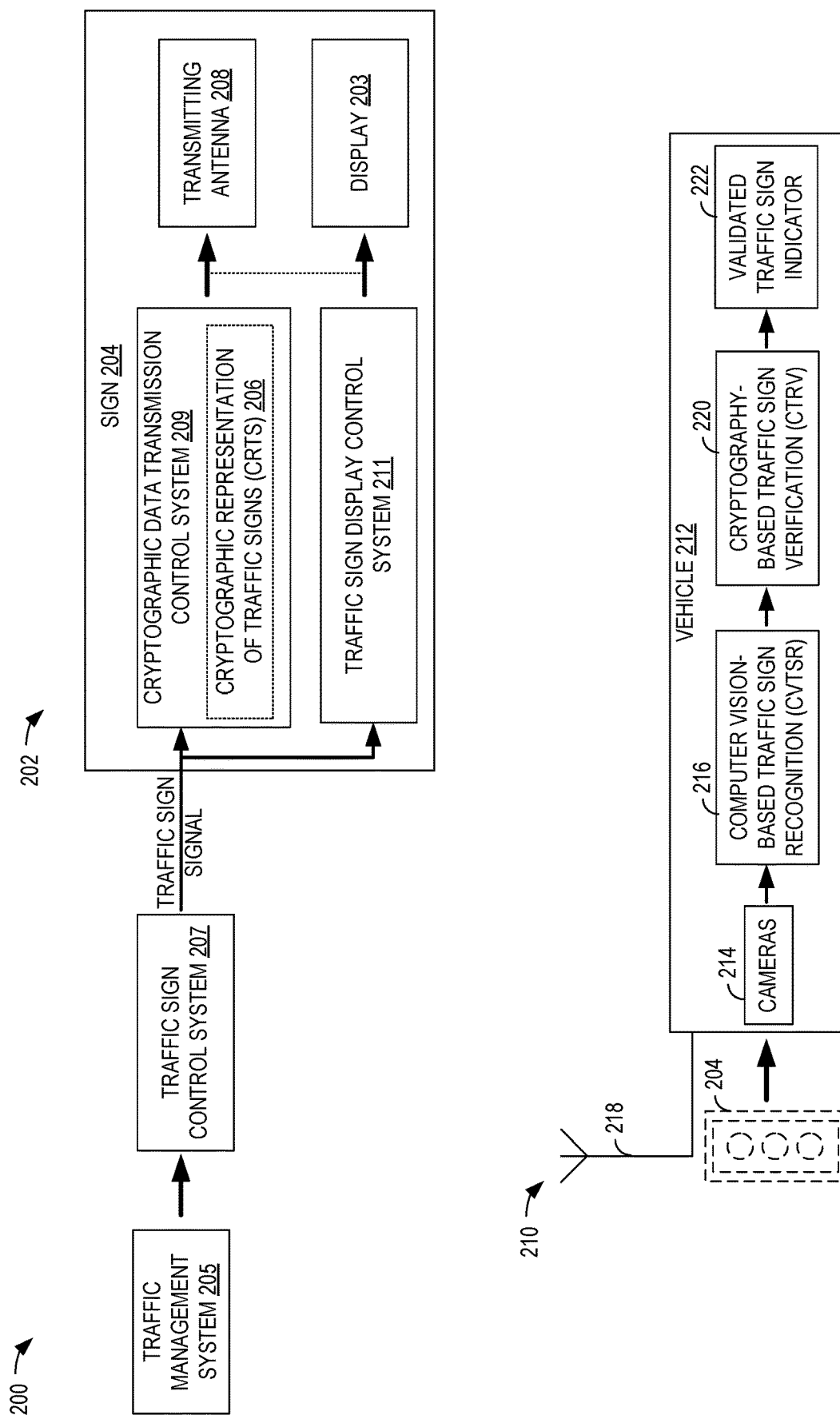
FIG. 2 shows an example traffic sign verification transceiver system in accordance with one or more embodiments of the present disclosure.

FIG. 2 shows a block diagram of an example transceiver system 200. A transmitter portion 202 of the transceiver system 200 includes a traffic sign 204, which displays, via a display 203, a traffic indicator to control the flow of traffic (e.g., a stop light/sign, a yield sign, etc.) and/or inform vehicle operators of a traffic/roadway parameter (e.g., an alert or advisory, a regulation such as a speed limit, etc.). The traffic sign 204 may be controlled via a traffic management system 205 (e.g., an official traffic authority, which may be a governmental entity in some examples). For example, an authorized personnel member and/or an authorized automated controller may provide input to and/or via the traffic management system 205 that is directed to a traffic sign control system 207 and used to generate a traffic sign signal indicative of a desired output for traffic sign 204. The desired output may refer to a displayed output for variable signs (e.g., signs that may be controlled to display different sign designations) and/or to a printed and/or manufactured output (e.g., a shape, color, text, or other parameter of a sign) for static signs.

The traffic sign 204 may include and/or be in communication with a computing device that is configured to provide a cryptographic representation of traffic signs (CRTS) and/or to control a display of the traffic sign. For example, the traffic sign 204 may include and/or be in communication with a cryptographic data transmission control system 209, including a CRTS module 206, which may include a processor and memory having instructions stored thereon to provide the cryptographic representation of traffic signs. In this way, the CRTS module 206 may be configured to generate a cryptographic representation of a traffic sign signal that is received from the traffic sign control system 207. The cryptographic data transmission control system 209 may be in communication with a transmitting antenna 208 that wireless transmits and/or broadcasts the generated (e.g., digital) cryptographic representation of the traffic sign signal (e.g., at regular intervals and/or responsive to a trigger, such as a request from or detection of a nearby vehicle).

The traffic sign 204 may also include and/or be in communication with a traffic sign display control system 211, which may include a processor (or use the same processor as the cryptographic data transmission control system 209) and instructions stored in the memory to generate display control instructions for altering the display 203 of the traffic sign 204 in accordance with the traffic sign signal. For example, the traffic sign signal may be received at the traffic sign display control system 211 and the cryptographic data transmission control system 209 in parallel, such that the generation of the cryptographic representation of the traffic sign signal is performed in parallel with the generation of the display control instructions for controlling the display 203 to display a traffic sign associated with the traffic sign signal. Accordingly, the display 203 may be controlled in parallel with the transmitting antenna 208, such that the cryptographic data is transmitted in synchronization with the display change (e.g., with no time or phase delays).

A receiver portion 210 of the transceiver system 200 may be incorporated in a vehicle 212 and includes a cascaded combination of computer vision-based traffic sign recognition and cryptography-based traffic sign verification (e.g., where the cryptography-based traffic sign verification uses output from the computer vision-based traffic sign recognition to perform verification of a recognized traffic sign). The computer vision-based traffic sign recognition may be used for an initial detection and recognition of the traffic sign, while the cryptography-based traffic sign verification may be used to perform authentication tasks for traffic sign legitimacy verification. It is to be understood, however, that one or more of the processes performed by the computer vision-based traffic sign recognition may be performed before, after, and/or concurrently with one or more of the processes performed by the cryptography-based traffic sign verification.

For the computer vision-based recognition, the receiver portion includes one or more cameras 214 and a computer vision-based traffic sign recognition (CVTSR) module 216. The cameras 214 each include one or more image sensors mounted on or in the vehicle 212 for imaging an environment of the vehicle. The cameras 214 may include a rear-view camera(s), a front-view camera(s), a side-view camera(s), a camera(s) with a wide field of view (e.g., a camera with a field of view that is greater than 180 degrees), and/or any other suitable camera associated with the vehicle. In addition to being used to image traffic signs, one or more of the cameras 214 may also be used to provide obstacle detection, lane recognition, surround-view imaging for display within the vehicle, and/or other imaging tasks.

The CVTSR module 216 may identify and/or classify traffic signs that are present in images captured by one or more of the cameras 214 using one or more image analysis techniques (e.g., thresholding, edge detection, object classification, etc.). For example, a plurality of objects, shapes, and/or other defining characteristics of traffic signs may be classified and stored in memory that is accessible by the CVTSR module 216 (e.g., local memory in the vehicle and/or memory accessible via a wired or wireless connection, such as a cloud-based storage device). Traffic sign identification and/or classification by the CVTSR module 216 may include utilizing deep learning algorithms and/or otherwise applying machine learning to comparing shapes of detected objects with those shapes already stored in the above-described memory to resolve detected objects as corresponding to associated traffic signs. The CVTSR module 216 may filter the stored traffic signs based on parameters of a detected object such as size, shape, color, location/environmental surroundings, position relative to a road surface, and/or other features of the detected object, which may include text and/or graphical elements displayed by or printed on the detected object. The detected object may be matched to a stored traffic sign based on a score associated with one or more of the traffic signs, each score being a function of an amount of similarity to one or more of the parameters of the stored traffic sign, where each parameter may have an associated weight for each stored traffic sign indicating a relevancy or uniqueness of that parameter to the stored traffic sign. For example, an octagon shape may be primarily used for stop signs, while a rectangular shape may be used for several different signs, such as a speed limit sign, an exit indicator, etc. Accordingly, a matching shape may be weighted more highly for a stop sign than for a speed limit sign. Any of the above factors, including the parameters used for matching and the weighting for each parameter, may be adjusted using machine learning (e.g., using training data in an initial calibration of the system and/or dynamically updating based on responses to real-time traffic sign identifications).

The above components may be used to provide an initial recognition of a traffic sign via computer vision. The initial recognition may then be used to verify the traffic sign by cryptography-based traffic sign verification components, which include an antenna 218 and a cryptography-based traffic sign verification (CTRV) module 220. The antenna 218 may be configured to receive information, such as the cryptographic representation of a traffic sign signal that is provided to control an output of traffic sign 204 and/or other cryptographic representations of traffic sign signals received from other traffic signs, wirelessly. The received information may be passed to the CTRV module 220 for processing in order to determine a traffic sign associated with (e.g., indicated by) the received information. For example, the CTRV module 220 may perform a verification of the received data (e.g., signature verification), decrypt the received information, and parse the decrypted information to confirm an identity associated with the associated traffic sign. The decrypted information may be compared to a database of traffic sign identifiers (e.g., stored locally at the vehicle and/or in a cloud-based storage device) in order to determine whether the transmitted data was corrupted during transmission (e.g., if the decrypted information matches the stored traffic sign identifier, the data was uncorrupted during transmission). The CTRV module 220 may provide the results of the cryptography-based traffic sign verification to a validated traffic sign indicator 222, which outputs a signal (e.g., to one or more vehicle systems, such as a display controller, a processor, an engine controller, etc.) indicating whether or not the traffic sign recognized by the CVTSR module 216 is valid. For example, if the traffic sign recognized by the CVTSR module 216 is indicated to be valid (e.g., if the one or more vehicle systems receive an output from the validated traffic sign indicator 222 indicating a successful decryption of the received cryptographic data followed by an ID comparison with the unique IDs stored locally in the vehicle), the one or more vehicle systems may proceed to control vehicle operation based on the recognized traffic sign (e.g., provide an automated response to the traffic sign, such as outputting an indicator of the traffic sign, adjusting autonomous operation of the vehicle to conform to the regulations and/or traffic control indicated by the traffic sign, etc.). Otherwise, if the traffic sign recognized by the CVTSR module 216 is indicated to be not valid (e.g., if the one or more vehicle systems receive an output from the validated traffic sign indicator 222 indicating that the decryption of the received cryptographic data was not successful), the one or more vehicle systems may not alter or control vehicle operations based on the recognized traffic sign and optionally may output a warning to the driver and/or to a traffic authority service to indicate that the traffic sign is potentially compromised.

Figure 3:
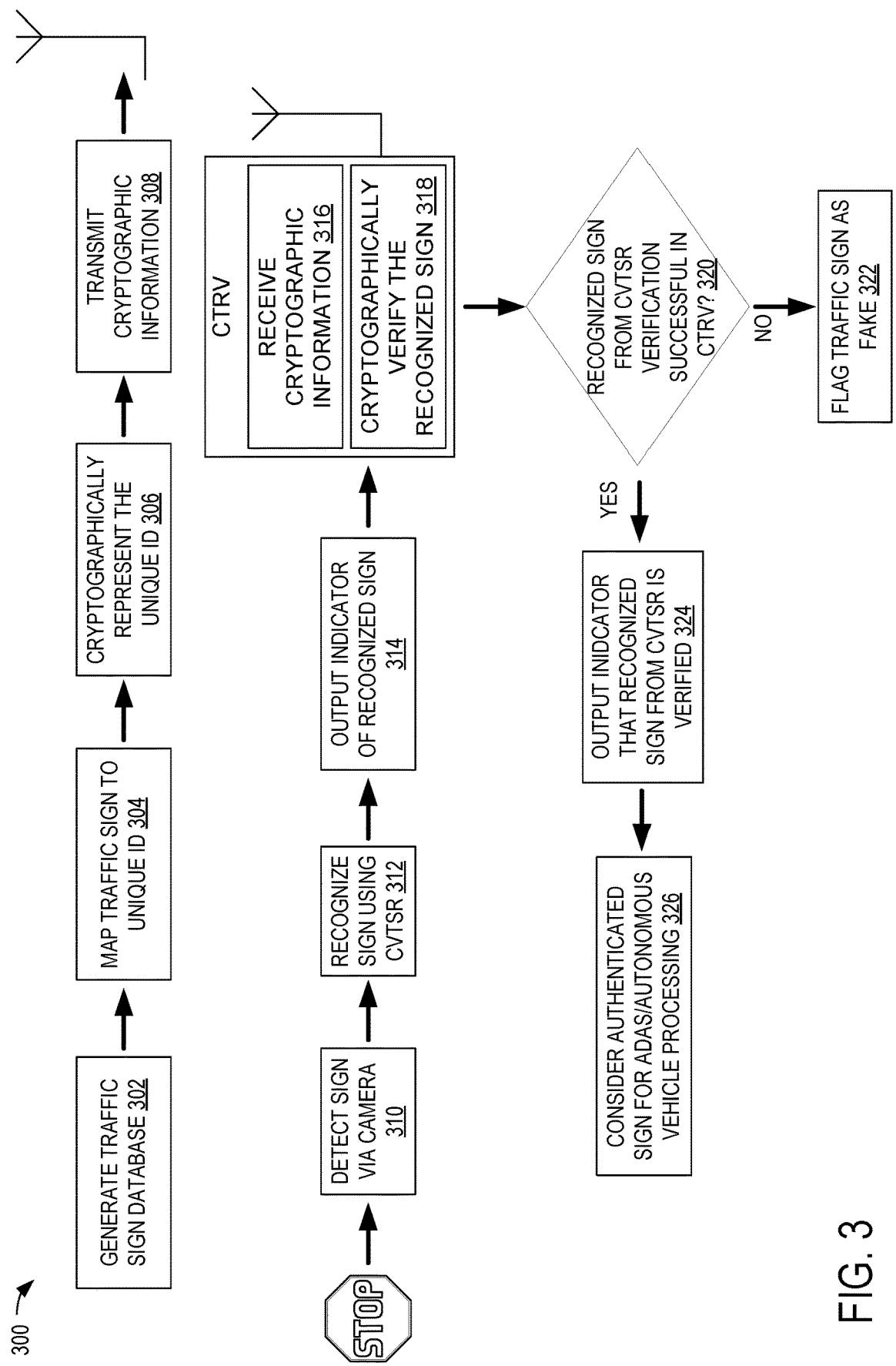
FIG. 3 shows a flow chart of an example method of identifying traffic signs using computer vision and cryptographic data in accordance with one or more embodiments of the present disclosure.

FIG. 3 shows a flow chart of an example method 300 of performing cryptographic verification of a traffic sign. For example, method 300 may be performed using the components of the transceiver system 200 of FIG. 2. At 302, the method includes generating a traffic sign database. The traffic sign database may be formed by mapping a plurality of unique IDs to each of a plurality of possible traffic signs. The traffic sign database may be generated using a centralized service and/or may be generated locally at each transmitter system (e.g., transmitter portion 202 of FIG. 2). The traffic sign database may be generated upon initialization of the associated system and/or continuously or periodically updated to refresh an assignment of unique IDs. For example, in order to increase security, unique IDs may be periodically reassigned, such that traffic signs have a possibility of receiving a different unique ID periodically. In this way, assigned unique IDs may expire after a threshold period of time that may be predetermined and/or based on a trigger (e.g., an indication that the database may be compromised, such as an indication that a faked traffic sign has been detected, an example of such a detection being described below). As described with respect to FIG. 2, the traffic sign database may be stored locally at a transmitter system and/or remotely at a centralized system (e.g., a cloud-based storage device) for access by the transmitter system.

At 304, the method includes mapping a traffic sign (e.g., the traffic sign associated with the transmitter system performing this portion of method 300, such as the transmitter portion 202 of FIG. 2) to a unique ID using the traffic sign database generated at 302. In order to prepare the unique ID for secure transmission, the method further includes cryptographically representing the unique ID, as indicated at 306. By encrypting the unique ID before transmission, the unique ID may only be discoverable to systems that have an associated key for signature verification and decryption (as will be described in more detail below with respect to FIGS. 4 and 5). In this way, the unique ID may be secured to prevent tampering with the verification process. At 308, the method includes transmitting cryptographic information including the cryptographically represented unique ID (e.g., via an antenna). The transmission of the cryptographic information may be continuous (e.g., via a continuous broadcast) in order to provide a highest degree of availability of the transmitted information. In other examples, the transmission of the cryptographic information may be periodic (e.g., via a broadcast that is repeated at regular intervals) in order to provide a high degree of availability while still providing some bandwidth, power, and/or other resource savings relative to the continuous broadcast example.

In still other examples, the transmission of cryptographic information may only be performed responsive to a trigger (e.g., responsive to detecting a request for the information from an oncoming vehicle and/or responsive to detecting, with a sensor associated with the transmitter system, an approach of a vehicle that is within a threshold distance of the traffic sign, the threshold distance being based on a range of the sensor in some examples). In the trigger-based example, the system may perform a continuous and/or periodic transmission for a predetermined period of time after detecting the trigger and/or until an exit trigger is detected (e.g., the vehicle is determined to be outside of the threshold distance of the traffic sign and/or is detected as heading away from the traffic sign). Alternatively, in the trigger-based example, the system may perform a predetermined number of transmissions (e.g., one to three transmissions) responsive to the trigger and not perform any additional transmissions until a next trigger is detected. The trigger-based example may provide a highest degree of resource savings relative to the continuous and period broadcast examples by only utilizing transmission resources responsive to a trigger that indicates that a vehicle or driver may be attempting to recognize the associated traffic sign. In each of the above examples of transmission, the data may be transmitted via a wireless communication link according to an associated protocol (e.g., WIFI, WIFI direct, cellular connectivity, BLUETOOTH, Near-Field Communication [NFC], etc.). For example, the transmission may occur on a proximity-based communication link (e.g., BLUETOOTH, NFC, etc.) in order to target vehicles that are near the traffic sign. Furthermore, in each of the above examples of transmission of cryptographic information, the cryptographic information may be updated responsive to a change in the traffic sign signal provided by the traffic sign control system (which also causes an associated change in a display of the traffic sign). The updated cryptographic information may correspond to an updated unique ID that corresponds to the updated traffic sign signal.

Turning now to the receiver system side of method 300 (e.g., performed by a vehicle-based system, such as receiver portion 210 including vehicle 212 of FIG. 2), the method includes detecting the traffic sign via a camera, as indicated at 310. For example, the detection at 310 may be performed by imaging a surrounding of the vehicle using camera 214 of FIG. 2. At 312, the method includes recognizing the traffic sign using a CVTSR module (e.g., CVTSR module 216 of FIG. 2). For example, as described above with respect to FIG. 2, the CVTSR module may process images captured by the camera (e.g., including images captured at 310) and identify a traffic sign in the processed images. At 314, the method includes outputting an indicator of the traffic sign recognized at 312 (e.g., an indicator associated with the identified traffic sign from the processed images). For example, the indicator may be a stored ID that is stored locally in the vehicle and mapped to the recognized traffic sign in the traffic sign database generated at 302, as the stored ID is used in the verification and decryption of received cryptographic information, as will be described in more detail below.

The output indicator may be provided to a CTRV module (e.g., CTRV module 220 of FIG. 2) for verification. In order to perform the verification, at 316 the method includes receiving, at the CTRV module, the cryptographic information that was transmitted at 308. At 318, the method includes cryptographically verifying, with the CTRV module, the recognized sign provided via the indicator output at 314. Verifying the recognized sign (e.g., recognized via the CVTSR module at 312) at 318 may include decrypting the cryptographic information received at 316 to determine the unique ID transmitted by the transmitter system and determining a traffic sign associated with the unique ID (e.g., based on mapping the unique ID to the traffic sign using the traffic sign database generated at 302 and/or an equivalent traffic sign database). The verification at 318 may further include determining, as indicated at 320, if the traffic sign recognized using the CVTSR module at 312 is valid (e.g., a locally-stored ID associated with the traffic sign recognized using the CVTSR module is usable to extract a private key (associated with the corresponding sign and stored in secured storage backed by a secure operating system) for successfully decrypting the information transmitted at 308. If the verification of the recognized sign from the CVTSR module is not successful (e.g., "NO" at 320), the method includes flagging the traffic sign as a fake, as indicated at 322. In some examples, a verification of the traffic sign may further include consulting additional information sources, such as news sources, police/fire/rescue information sources, weather reports, and/or other information sources, which may identify current conditions near the vehicle and assist with determining a likelihood that a traffic sign is valid. For example, if a traffic sign is determined to indicate that a road is closed and a police scanner is also determined to have reported such a closure, the traffic sign may be likely to be valid. Alternatively, if a traffic sign is determined to indicate a storm in the area, but no such storm is reported in the area via any news and/or weather sources, the traffic sign may be likely to be invalid or inaccurate.

As described above with respect to FIG. 2, flagging the traffic sign as fake may include ignoring the detection of the traffic sign via the CVTSR module such that one or more vehicle systems are not controlled based on the traffic sign recognized via the CVTSR module. In this way, the vehicle operations may be maintained as though no traffic sign was detected by the CVTSR module and/or vehicle operations may only be controlled based on a traffic sign indicated by the cryptographic information received at 316 and processed by the CTRV module. In additional or alternative examples, some vehicle operations may be maintained, while others are adjusted responsive to the detection of a fake traffic sign (e.g., other traffic signs that are a predetermined distance from the fake traffic sign may be ignored and/or subject to higher levels of scrutiny by the verification system, a display in the vehicle may be altered to output a warning regarding the fake sign, a communication system of the vehicle may be operated to send an indication of the fake sign and associated details to a traffic or law enforcement authority computing system, etc.).

In still further examples, vehicle operations may be selectively adjusted to adhere to the regulation and/or information of the traffic sign detected via computer vision or the traffic sign indicated by the data received via the vehicle antenna based on a predicted safety score of the two potential traffic signs. For example, if the traffic sign detected via the camera is identified as a speed limit sign that advertises a 70 mph speed limit, and the unique ID received via the cryptographic data indicates a speed limit sign that advertises a 60 mph speed limit, the vehicle may be adjusted to operate in accordance with the lower speed limit, which may have a higher predicted safety score. Safety scores may be determined based on a variety of parameters, including known regional laws, detected behaviors of neighboring vehicles, detected objects/obstacles near the vehicle, weather, and/or other conditions. Vehicle systems may be operated according to any one or more of the examples above and the prior-described portions of method 300 may be repeated until such time as a traffic sign is verified at 320.

If the CVTSR verification is successful (e.g., "YES" at 320), the method proceeds to 324 to output an indicator that the recognized sign from the CVTSR module is verified. The method may further include considering the authenticated/verified sign for Automatic Driver Assistance System (ADAS) and/or autonomous vehicle processing, as indicated at 326. For example, as described above, the verified sign may be used to control operations of the vehicle in accordance with the type of traffic sign and associated regulation/warning/indication provided by the verified sign.

Figure 4:
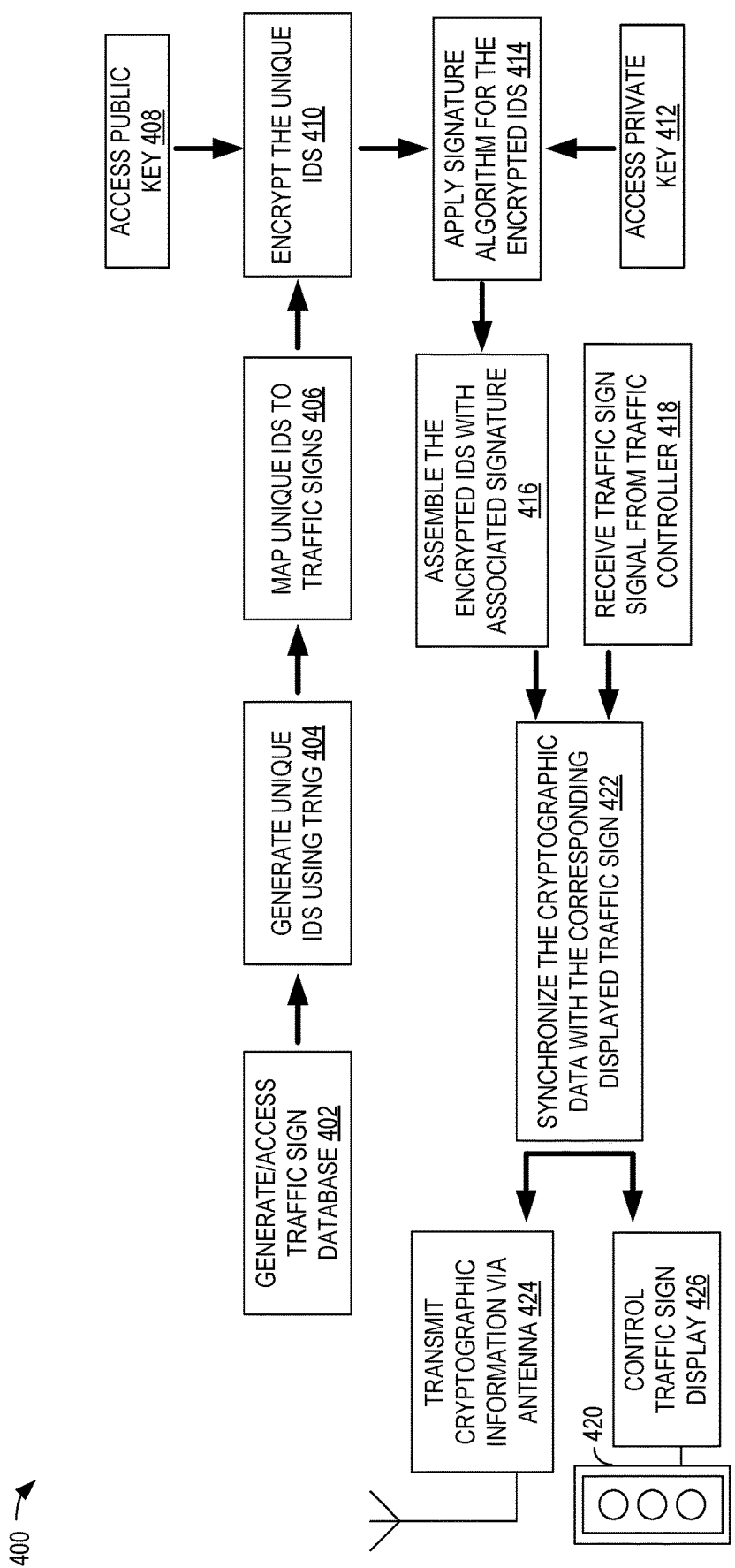
FIG. 4 shows a flow chart of an example method of securing traffic sign data for transmission by a transmitter system in accordance with one or more embodiments of the present disclosure.
Figure 5:
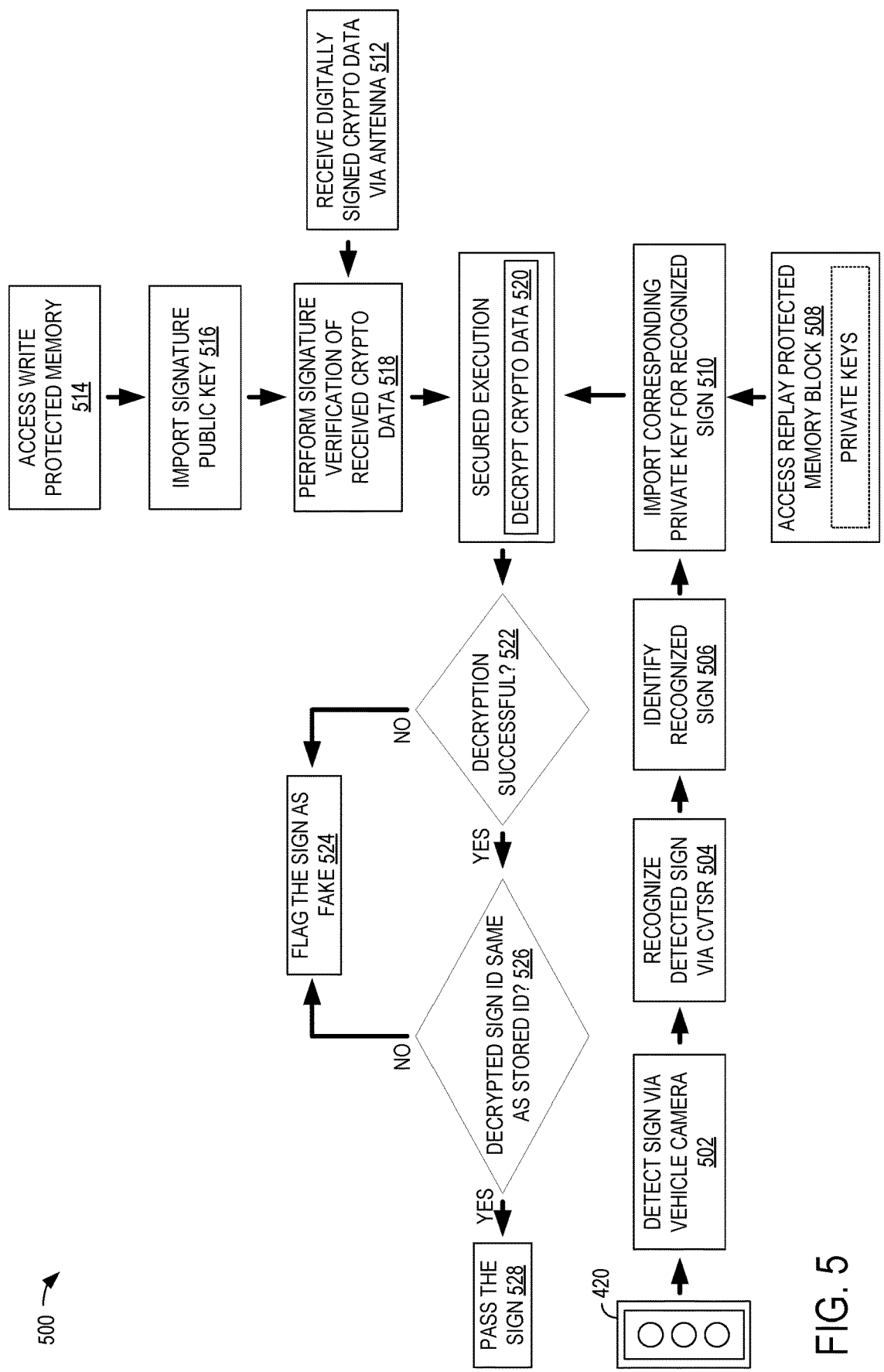
FIG. 5 shows a flow chart of an example method of identifying traffic signs at a receiver system in accordance with one or more embodiments of the present disclosure.

FIGS. 4 and 5 show flow charts of example detailed methods 400 and 500 for cryptographic transmission of traffic sign information and cryptographic reception/verification of traffic sign information, respectively. In some examples, method 400 may be performed by a transmitter system associated with a traffic sign, such as transmitter portion 202 of FIG. 2, while method 500 may be performed by a receiver system associated with a vehicle, such as receiver portion 210 of FIG. 2.

Method 400 includes generating and/or accessing a traffic sign database at 402. For example, all possible traffic signs known to the transmitter system may be collected into the traffic sign database. As described in more detail above, the traffic sign database may be generated locally at the transmitter system and/or remotely (e.g., at a centralized system, such as a cloud-based storage system). Accordingly, operations regarding the generation of the traffic sign database as described herein may be performed at the transmitter system and/or at a remote system. At 404, the method includes generating a unique ID for each traffic sign using a True Random Number Generator (TRNG). It is to be understood that the TRNG generation technique described herein is an example identifier generation technique, and unique IDs may be generated in other manners without departing from the scope of this disclosure.

At 406, the method includes mapping the unique IDs generated at 404 to the traffic signs of the database generated/accessed at 402. In this way, the database generated at 402 may be updated to store, for each traffic sign, an association between the traffic sign (e.g., an initial traffic sign identifier) and a selected one of the generated unique IDs. The mapping performed at 406 may be rule-based (e.g., an association and/or assignment of unique IDs to traffic signs may be determined based on one or more rules) and/or may be random (e.g., determined via a random generation technique).

An encryption of the unique IDs may be performed using public-key cryptography. For example, at 408, the method includes accessing an encryption public key of an encryption algorithm, which is used at 410 to encrypt the unique IDs generated at 404. For example, each unique ID may be transformed to a different value and/or string by applying the public key accessed at 408 to the unique ID according to a selected encryption algorithm (e.g., applying, for each unique ID, a mathematical function in which at least the unique ID and the public key are inputs). The method may also include signing the encrypted unique IDs by accessing a private key (e.g., known only to the transmitter system) at 412 and applying a cryptographic signature algorithm on the encrypted unique IDs (encrypted at 410) using the private key, as indicated at 414. The private key (as well as the public key) may be stored in a proprietary legal traffic signal installation agency.

At 416, the method includes assembling the encrypted unique IDs (encrypted at 410) with the associated signature (applied at 414) in order to generate cryptographic data. In this way, the cryptographic data for each unique ID includes the encrypted unique ID (encrypted using the public key) signed with a digital signature that is based on the private key. In some examples, the digital signature may include a hash of the encrypted unique ID that is in turn encrypted using the private key.

At 418, the method includes receiving a traffic sign signal from a traffic controller, which includes an indication of a traffic sign to be displayed on a traffic sign 420 that is associated with the transmitter system. For example, the traffic sign 420 may include computing elements such as the transmitter system. A processor of the traffic sign may synchronize the cryptographic data with the corresponding displayed traffic sign, as indicated at 422 based on the traffic sign signal received at 418. The synchronization of 422 may be performed in order to select cryptographic data that is associated with (e.g., formed using) the unique ID assigned to the traffic sign to be displayed according to the traffic sign signal. In some examples, there may be an additional layer of security to ensure that the synchronization is only performed for indications of a traffic sign display that originate from changes in the traffic sign performed by authorized sources.

At 424, the method includes transmitting the cryptographic information via an antenna of the transmitter system. For example, the cryptographic information corresponding to the cryptographic data for the unique ID associated with the traffic sign signal from the traffic controller is transmitted at 424. The transmission of cryptographic data may be performed similarly to the transmission described above at 308 of method 300 of FIG. 3. At 426, the method includes controlling the traffic sign display of traffic sign 420 in order to display the sign indicated by the traffic sign signal received at 418. The control of the traffic sign display may be synchronized with the transmission of the cryptographic information so that the display of the traffic sign is changed when the cryptographic information that is transmitted is changed. In this way, the synchronization performed at 422 may generate a signal that is passed to both the display and the antenna without any time delays there between.

An example of pseudo code that may represent operation at the transmitter system is provided below:
//Infinite Loop
1. Traffic sign DB={Sn1, Sn2 . . . SnN}
2. Unique ID=TRNG (x), where ID={ID1, ID2 . . . IDN}
3. Assign{Sn1, Sn2 . . . SnN}={ID1, ID2 . . . IDN}
4. Encrypted Sign (ID)=Encrypt (ID, E.Key Pub)
5. Digital signature (Encrypted Sign (ID))=Signature algorithm (Encrypted Sign (ID), S.KeyPri)
6. Cryptographic sign data=[Encrypted Sign (ID) Digital signature (Encrypted Sign (ID))], where Cryptographic sign data={Cryptographic sign data (ID1), Cryptographic sign data (ID2), Cryptographic sign data (ID3) Cryptographic sign data (IDN)}
7. Synchronized Cryptographic sign data=Sync(Display sign, Cryptographic sign data)
8. Output=Transmit (Synchronized Cryptographic sign data)

Turning now to method 500, a cryptographic reception operation for a vehicle-based receiver system is shown, as described above. At 502, the method includes capturing a traffic sign image using a camera of the vehicle. The capture of the traffic sign image may be performed as described above with respect to the operation of cameras 214 of FIG. 2 and/or the image capture at 310 of method 300 of FIG. 3. At 504, the method includes recognizing the detected sign via a CVTSR module (e.g., as described above with respect to CVTSR module 216 of FIG. 2 and/or the recognition operation at 312 of method 300 of FIG. 3). For example, an external informational image including electronically displayed information that is received at the vehicle may be analyzed to identify the electronically displayed information from a display source (e.g., the traffic sign). The electronically displayed information may include an image, characters, and/or other electronically displayed information presented by the display source (e.g., the traffic sign). Accordingly, an indication of a traffic sign recognized via computer-vision (e.g., a stored ID for the recognized sign stored locally at the vehicle) is identified at 506. The identification may additionally or alternatively include generating a characteristic field (e.g., a character field that includes characters associated with or included in the electronically displayed information, a simplified version of the image/electronically displayed information from the display source, and/or another representation of the electronically displayed information).

At 508, the method includes accessing a replay protected memory block (RPMB) that is local to the vehicle (which stores a plurality of public keys for decrypting received data, each public key representing/corresponding to a different respective possible recognized sign). In order to decrypt and verify the received data, the method further includes importing, at 510, a corresponding private key corresponding to the recognized sign (e.g., the sign recognized at 504, the private key corresponding to the stored ID associated with the recognized sign as identified at 506). For example, unique public key/private key pairs are used in the encryption of unique IDs for different signs, thus, each unique ID is encrypted using a unique public key in the transmitter during encryption, and corresponding unique private keys are used in the receiver (e.g., the vehicle) to perform decryption.

In order to confirm the recognized sign, the vehicle may perform a verification using data that is transmitted by a transmitter associated with the sign. At 512, the method includes receiving digitally-signed cryptographic data via an antenna of the vehicle (e.g., the digitally-signed cryptographic data transmitted at 424 of method 400 of FIG. 4). A signature for each sign is made at the transmitter using a single private key (e.g., the same private key for all signs), thus, a corresponding public key (e.g., that is part of a symmetric public/private key pair for signature verification) is used in signature verification at the receiver. Accordingly, at 514, the method includes accessing write protected memory of the vehicle, and at 516, the method includes importing (e.g., from the write protected memory, which has integrity check associated therewith) a signature public key (e.g., which is handled and/or generated via an original equipment manufacturer) for signature verification.

At 516, the method includes performing signature verification on the received digitally-signed cryptographic data (received at 512) using the imported signature public key. For example, the public key may be applied to the cryptographic data in order to ensure that the received data matches the signed data (e.g., in order to verify that no changes were made to the data after the data was signed). A verification process may include decrypting the signature/digitally-signed cryptographic data using the imported signature public key to generate a decrypted hash, then performing a second computed hash of the same data (e.g., using the same hashing algorithm as the transmitter system) to determine if the second computed hash matches the received digitally-signed cryptographic data. A match indicates that the data was likely not tampered with, while a mismatch indicates that the data was likely compromised.

Unauthorized signals are rejected in the above signature verification, while authorized traffic signals that are successfully verified in the above digital signature verification are passed for decryption. Accordingly, at 520, the method includes decrypting the signature-verified cryptographic data using the private key (imported at 510 from the RPMB based on the computer vision-based sign recognition) in a secured execution mode of a secured operating system in the vehicle. At 522, the method includes determining whether the decryption was successful. For example, identifying successful decryption may include determining whether the private key imported at 510 was able to be used to decrypt the cryptographic data (e.g., indicating that the correct key is retrieved from RPMB for decryption, which in turn indicates that the recognized sign from the computer vision-based traffic sign recognition is correct). If the decryption is not successful (e.g., "NO" at 522), the method includes flagging the detected traffic sign as a fake, as indicated at 524. The flag may be propagated to vehicle systems and/or to third-party systems (e.g., a traffic authority system) as described above with reference to the flagging at 322 of FIG. 3.

Alternatively, if the decryption is successful (e.g., "YES" at 522), the method proceeds to 526 to determine if the decrypted sign ID (e.g., revealed via the decryption performed at 520) is the same as the stored ID stored locally at the vehicle (e.g., the stored ID assigned to the recognized sign that is recognized by the computer vision based sign recognition at 504, which is the same as the ID that is assigned to the corresponding traffic sign at the transmitter side during transmission). Additionally or alternatively, the determination at 526 may include comparing the characteristic field generated based on the CVTSR-based identification of the electronically displayed information from the display source (e.g., the traffic sign) to the cryptographic data received at the vehicle from the display source. The cryptographic data may include cryptographically-secured information including characters of the electronically displayed information (e.g., the traffic sign), a subset of the characters of the electronically displayed information, and/or data representing the electronically displayed information (which may be a simplified or truncated version of the displayed sign in some examples). The comparison of the characteristic field to the cryptographic data may include decrypting the cryptographic data using a key retrieved based on the characteristic field (e.g., as described above with reference to retrieving a key using the stored ID) in order to generate resulting decrypted data. The resulting decrypted data may be compared to the characteristic field in order to determine if there is a match (which indicates a verified sign).

If the decrypted sign ID is not the same as the stored ID (e.g., "NO" at 526, indicating that the sign ID is corrupted), the method proceeds to 524 to flag the sign as a fake, as described above. Alternatively, if the decrypted sign ID is the same as the stored ID (e.g., "YES" at 526, indicating that the sign ID is not corrupted), the method includes passing the authenticated and verified traffic sign to one or more vehicle systems (e.g., passing an identification of the authenticated traffic sign to an ADAS and/or autonomous vehicle processing system for use in controlling the vehicle and/or the one or more vehicle systems), as indicated at 528. For example, if the sign is verified, one or more vehicle systems may be controlled to adhere to a regulation associated with the verified sign (e.g., the electronically displayed information of the verified sign). Otherwise, if the sign is not verified and/or otherwise flagged as a fake, the vehicle system(s) may not be controlled to adhere to the regulation associated with the sign/electronically displayed information.

An example of pseudo code that may represent operation at the receiver system is provided below:
//Infinite Loop
1. Traffic sign image=Camera (Traffic sign pole)
2. Recognized traffic sign=CVTSR (Traffic sign image)
3. Received_crypto_data=Receive (Transmit (Synchronized Cryptographic sign data))
4. S.KeyPub=Import signature key (Integrity check storage (Recognized traffic sign))
5. Encrypted Sign (ID)=Signature verification algorithm (Received_crypto_data, S.KeyPub)
6. Sign verification successful
7. D.KeyPri=Import Decryption Key(Replay Protected Memory Block)
8. Decrypt (Encrypted Sign (ID), D.KeyPri)
9. ADAS/Autonomous vehicle operation=Pass (Recognized traffic sign, Decryption successful)

A non-limiting example scenario of using the traffic sign detection systems of the present disclosure is provided for illustrative purposes. In the example scenario, a traffic sign may be configured to display three possible signs: Sign-1: Stop, Sign-2: Right, and Sign-3: Left. These signs may be stored in a traffic sign database and a unique ID may be generated (e.g., using a TRNG) for each of the possible signs and mapped (e.g., randomly) to an associated sign. For example, the TRNG may generate three unique IDs: 111, 222, and 333, and the IDs may be mapped to the possible signs as follows: Stop=111, Right=222, and Left=333. Accordingly, the traffic sign database may store the above mapping of signs to associated unique IDs.

Continuing the above example scenario, unique pairs (e.g., public key and private key pairs may then be generated for each sign. An example of the unique key pairs used for each sign for encryption follows:
$(KEY_{Pub-Stop}, KEY_{Pri-Stop})$
$(KEY_{Pub-Right}, KEY_{Pri-Right})$
$(KEY_{Pub-Left}, KEY_{Pri-Left})$.

The above generated public keys may be used for encrypting the unique IDs as follows:
Encrypted_Stop=Encrypt (111, $KEY_{Pub-Stop}$)
Encrypted_Right=Encrypt (222, $KEY_{Pub-Right}$)
Encrypted_Left=Encrypt (333, $KEY_{Pub-Left}$)

Once the encryption is completed using the public keys of the corresponding signs, a corresponding signature is applied on each of the unique IDs using a single private key of the authorizing authority (e.g., an administrative entity). The symmetric keys used for the signature are: $(KEY_{sign-Pub}, KEY_{sign\_Pri})$.

The encrypted IDs and the corresponding signatures are assembled to form cryptographic data as shown below, which is stored in a cryptographic database:
Cryptographic_data_stop=[Encrypted_Stop|Signature]
Cryptographic_data_right=[Encrypte_Right|Signature]
Cryptographic_data_left=[Encrypted_Left|Signature].

The public keys used in the encryption and the private key used in the signature at the transmitter may be handled by a government authorized traffic management authority.

Once the traffic sign signal arrives from the traffic sign control system, the signal is sent to both a display control system and a cryptographic data transmission control system for the targeted sign. The display control system displays the received sign on the display and the cryptographic data transmission control system transmits the corresponding cryptographic data of the received sign in synchronicity with the display control system.

At a receiver (e.g., a vehicle that approaches the traffic sign), the transmitted cryptographic data is received and signature verification is performed by retrieving a public key stored in write protected memory of the vehicle (e.g., memory that has a read-only partition where an integrity check is applied on the storage). For example, the received signal on the receiving antenna (e.g., of the vehicle) is Signal_Received. If the received signal is from the valid transmitting authority then the signature verification is successful. If the received signal is transmitted from an unauthorized authority (e.g., a hacker), then the signature verification fails. After a successful signature verification "Signature_verified_data" is obtained, which is in an encrypted format. For example, the successful signature verification may yield: Signature_verified_ data= Signature_ verification (Signal_Received, $KEY_{sign-pub}$). The receiver may then decrypt the Signature_verified_data using the private key, which was a part of the generated (public, private) key pair described above.

The computer vision system at the receiver (e.g., before, during, and/or after the above processing is performed on the received signal) performs traffic sign recognition using imaging processing techniques (e.g., using a computer vision traffic sign recognition [CVTSR] module) and recognizes a traffic sign. At the receiver, all of the private keys corresponding to possible traffic signs are stored in a Replay Protected Memory Block (RPMB) of memory in order to protect the private keys. The private keys stored in RPMB and a public key stored in the integrity check memory at the receiver (e.g., the vehicle) may be handled by the Original Equipment Manufacturers (OEMs). The keys which are stored in the RPMB of this example include:

$KEY_{Pri\text{-}Stop}$
$KEY_{Pri\text{-}Right}$
$KEY_{Pri\text{-}Left}$

The decryption of the Signature_vertified_data is performed using the corresponding private key of the recognized sign from the computer vision traffic sign recognition (CVTSR) module of the vehicle. For example, if the recognized sign from the CVTSR is Stop, then the corresponding private key of the Stop sign ($KEY_{Pri\text{-}Stop}$) is retrieved from the RPMB and decryption of the Signature_verified_data is performed in secured execution. The resulting decrypted data is as follows:

Decrypted_ID=Decryption (Signature_verified_data, $KEY_{Pri\text{-}Stop}$)

If the recognized sign from the CVTSR is correct, then the Signature_verified_data will be successfully decrypted using the above decryption mechanism. Otherwise, the decryption will fail. The recognized sign from the CVTSR is thus used for the decryption, such that a failure in decryption indicates that the computer vision-based recognition of the sign is incorrect, which in turn indicates that the traffic sign display is hacked or otherwise not displaying an authorized sign.

Once the decryption is successful, then the correctness of the decrypted data is performed/determined by comparing the Decrypted_ID with the correct ID for the computer vision-recognized sign, which is assigned to each sign during transmission. If the Decrypted_ID is correct, the data transmitted may be determined to have remained uncorrupted during transmission.

The traffic sign detection systems of the present disclosure utilize both computer vision-based recognition and cryptography-based verification to authenticate detected traffic signals using multiple layers of security. The above-described approaches have a technical effect of increasing accuracy and reliability of traffic sign detection in the vehicle, which in turn increases accuracy and reliability of vehicle control based on detected traffic signs.

Figure 6:
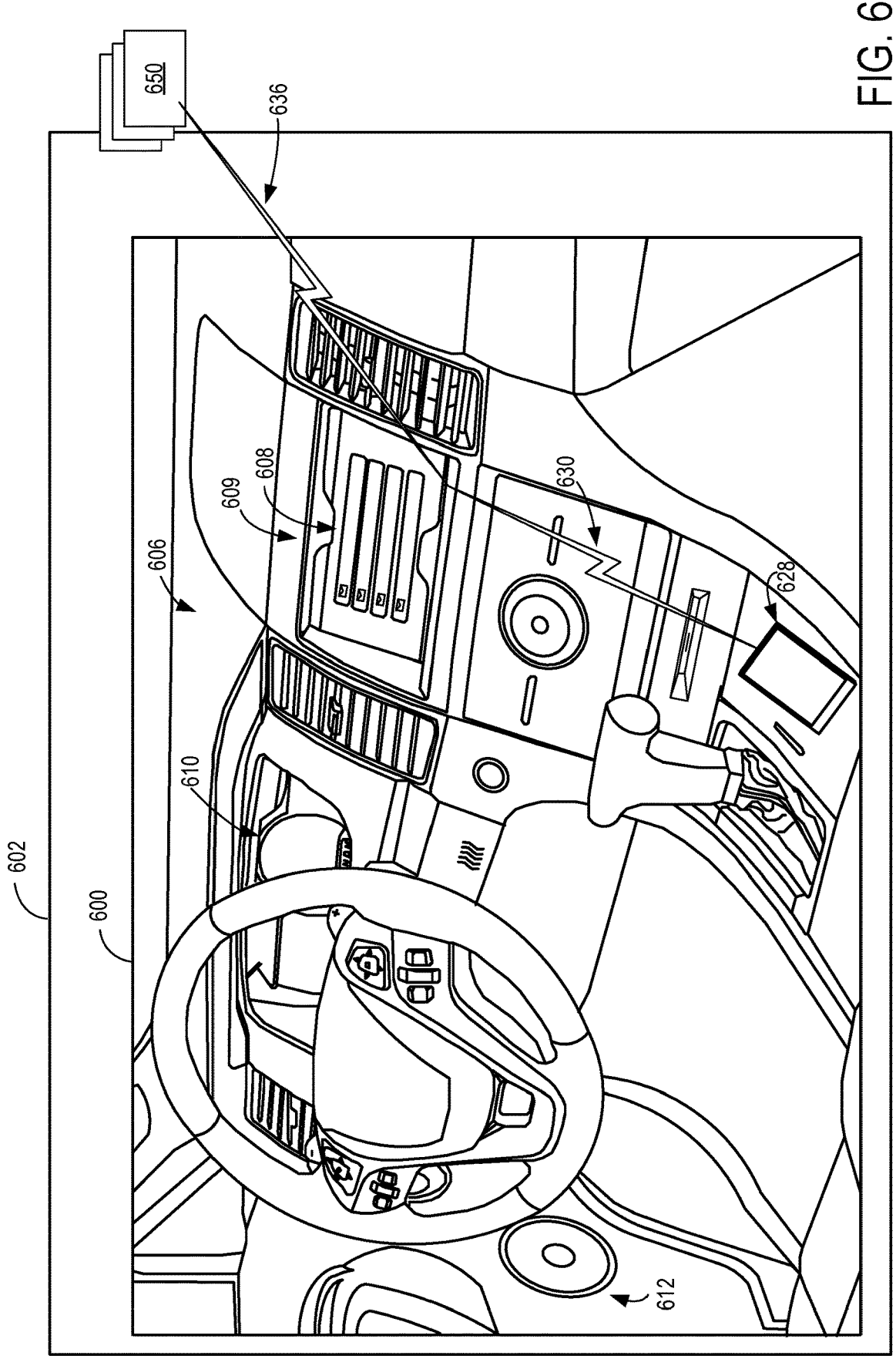
FIG. 6 shows an example partial view of a vehicle cabin in accordance with one or more embodiments of the present disclosure.

As described above, the described methods may be performed, at least in part, within a vehicle using an in-vehicle computing system as an emergency vehicle alert system. FIG. 6 shows an example partial view of one type of environment for an emergency vehicle alert system: an interior of a cabin 600 of a vehicle 602, in which a driver and/or one or more passengers may be seated. Vehicle 602 of FIG. 6 may include and/or be an example of vehicle 102 of FIG. 1 and/or vehicle 212 of FIG. 2.

As shown, an instrument panel 606 may include various displays and controls accessible to a driver (also referred to as the user) of vehicle 602. For example, instrument panel 606 may include a touch screen 608 of an in-vehicle computing system 609 (e.g., an infotainment system), an audio system control panel, and an instrument cluster 610.

In some embodiments, one or more hardware elements of in-vehicle computing system 609, such as touch screen 608, a display screen, various control dials, knobs and buttons, memory, processor(s), and any interface elements (e.g., connectors or ports) may form an integrated head unit that is installed in instrument panel 606 of the vehicle. The head unit may be fixedly or removably attached in instrument panel 606. In additional or alternative embodiments, one or more hardware elements of the in-vehicle computing system may be modular and may be installed in multiple locations of the vehicle.

The cabin 600 may include one or more sensors for monitoring the vehicle, the user, and/or the environment. For example, the cabin 600 may include one or more microphones to receive user input in the form of voice commands and/or to measure ambient noise in the cabin 600 or outside of the vehicle, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 650 and/or a mobile device 628.

Cabin 600 may also include one or more user objects, such as mobile device 628, that are stored in the vehicle before, during, and/or after travelling. The mobile device 628 may include a smart phone, a tablet, a laptop computer, a portable media player, and/or any suitable mobile computing device. The mobile device 628 may be connected to the in-vehicle computing system via a communication link 630. The communication link 630 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 628 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 630 may provide sensor and/or control signals from various vehicle systems (such as vehicle audio system, sensor subsystem, etc.) and the touch screen 608 to the mobile device 628 and may provide control and/or display signals from the mobile device 628 to the in-vehicle systems and the touch screen 608. The communication link 630 may also provide power to the mobile device 628 from an in-vehicle power source in order to charge an internal battery of the mobile device.

In-vehicle computing system 609 may also be communicatively coupled to additional devices operated and/or accessed by the user but located external to vehicle 602, such as one or more external devices 650. In the depicted embodiment, external devices are located outside of vehicle 602 though it will be appreciated that in alternate embodiments, external devices may be located inside cabin 600. The external devices may include a server computing system, personal computing system, portable electronic device, electronic wrist band, electronic head band, portable music player, electronic activity tracking device, pedometer, smart-watch, GPS system, etc. External devices 650 may be connected to the in-vehicle computing system via a communication link 636 which may be wired or wireless, as discussed with reference to communication link 630, and configured to provide two-way communication between the external devices and the in-vehicle computing system. For example, external devices 650 may include one or more sensors and communication link 636 may transmit sensor output from external devices 650 to in-vehicle computing system 609 and touch screen 608. External devices 650 may also store and/or receive information regarding navigational map data, image feature mapping data, etc. and may transmit such information from the external devices 650 to in-vehicle computing system 609 and/or touch screen 608.

In-vehicle computing system 609 may analyze the input received from external devices 650, mobile device 628, and/or other input sources and provide output via touch screen 608 and/or speakers 612, communicate with mobile device 628 and/or external devices 650, and/or perform other actions based on the assessment. In some embodiments, all or a portion of the assessment may be performed by the mobile device 628 and/or the external devices 650. In some embodiments, the external devices 650 may include in-vehicle computing devices of another vehicle.

In some embodiments, one or more of the external devices 650 may be communicatively coupled to in-vehicle computing system 609 indirectly, via mobile device 628 and/or another of the external devices 650. For example, communication link 636 may communicatively couple external devices 650 to mobile device 628 such that output from external devices 650 is relayed to mobile device 628. Data received from external devices 650 may then be aggregated at mobile device 628 with data collected by mobile device 628, the aggregated data then transmitted to in-vehicle computing system 609 and touch screen 608 via communication link 630. Similar data aggregation may occur at a server system and then transmitted to in-vehicle computing system 609 and touch screen 608 via communication link 636 and/or communication link 630.

Figure 7:
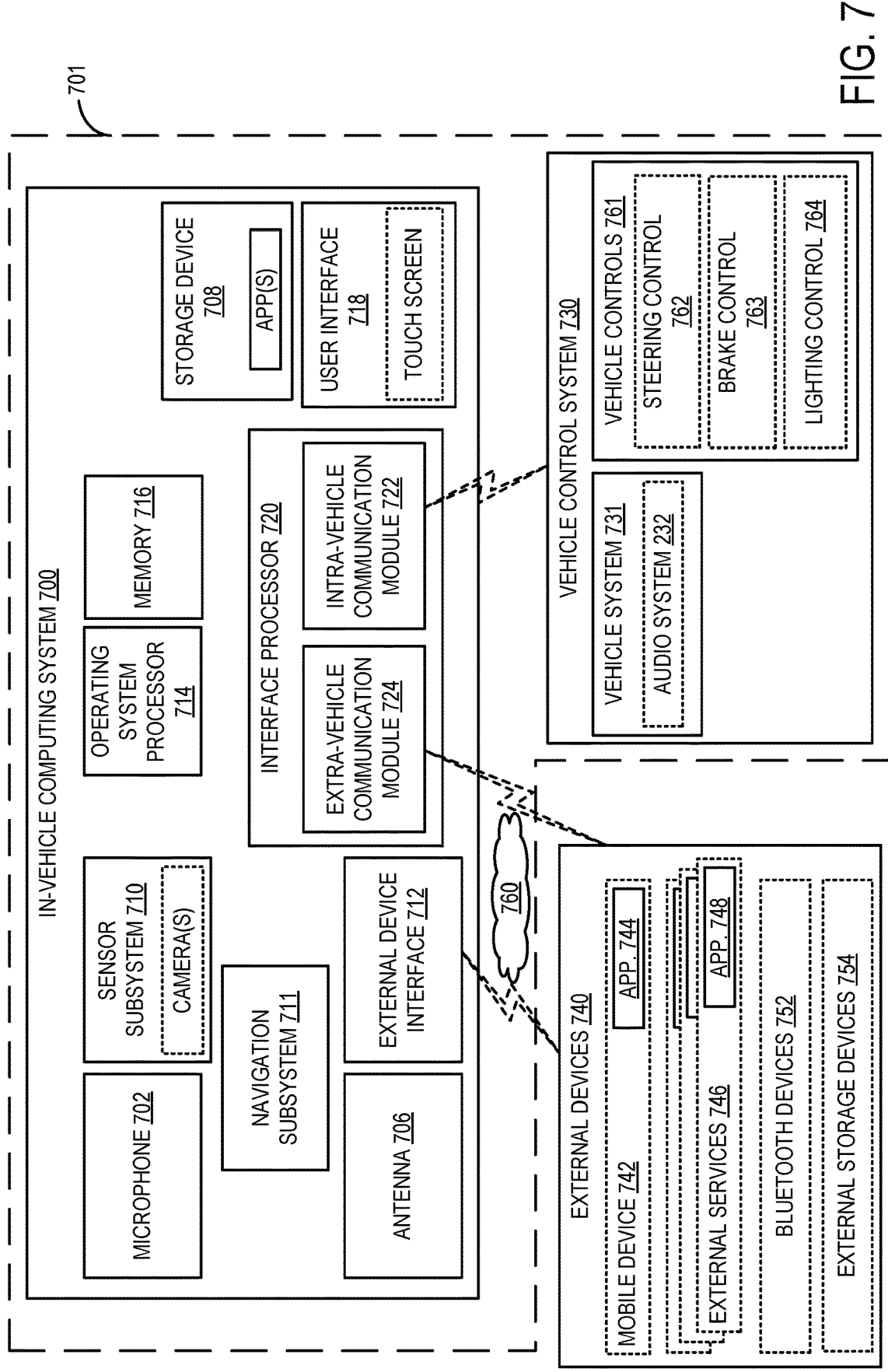
FIG. 7 shows a block diagram of an in-vehicle computing system in accordance with one or more embodiments of the present disclosure.

FIG. 7 shows a block diagram of an in-vehicle computing system 700 configured and/or integrated inside a vehicle 701. In-vehicle computing system 700 may be an example of in-vehicle computing system 609 of FIG. 6 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 701 in order to enhance an in-vehicle experience for a driver and/or a passenger.

In-vehicle computing system 700 may include one or more processors including an operating system processor 714 and an interface processor 720. Operating system processor 714 may execute an operating system on the in-vehicle computing system, and control input/output, display, playback, and other operations of the in-vehicle computing system. Interface processor 720 may interface with a vehicle control system 730 via an intra-vehicle communication module 722.

Intra-vehicle communication module 722 may output data to other vehicle systems 731 and vehicle control elements 761, while also receiving data input from other vehicle systems 731 and/or vehicle control elements 761, e.g., by way of vehicle control system 730. When outputting data, intra-vehicle communication module 722 may provide a signal via a bus corresponding to any status of the vehicle, the vehicle surroundings (e.g., as measured by one or more microphones or cameras mounted on the vehicle), or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), and digital signals propagated through vehicle data networks (such as an engine controller area network [CAN] bus through which engine related information may be communicated and/or an audio-video bridging [AVB] network through which vehicle information may be communicated). For example, the in-vehicle computing system may retrieve from the engine CAN bus the current speed of the vehicle estimated by the wheel sensors, a current location of the vehicle provided by the GPS sensors, and a current trajectory of the vehicle provided by one or more inertial measurement sensors in order to determine an estimated path of the vehicle. In addition, other interfacing means such as Ethernet may be used as well without departing from the scope of this disclosure.

A non-volatile storage device 708 may be included in in-vehicle computing system 700 to store data such as instructions executable by processors 714 and 720 in non-volatile form. The storage device 708 may store application data to enable the in-vehicle computing system 700 to perform any of the above-described methods and/or to run an application for connecting to a cloud-based server and/or collecting information for transmission to the cloud-based server. Connection to a cloud-based server may be mediated via an extra-vehicle communication module 724. The application may retrieve information gathered by vehicle systems/sensors, input devices (e.g., a user interface 718), devices in communication with the in-vehicle computing system (e.g., a mobile device connected via a Bluetooth link), etc. In-vehicle computing system 700 may further include a volatile memory 716. Volatile memory 716 may be random access memory (RAM). Non-transitory storage devices, such as non-volatile storage device 708 and/or volatile memory 716, may store instructions and/or code that, when executed by a processor (e.g., operating system processor 714 and/or interface processor 720), controls the in-vehicle computing system 700 to perform one or more of the actions described in the disclosure.

A microphone 702 may be included in the in-vehicle computing system 700 to measure ambient noise in the vehicle, to measure ambient noise outside the vehicle, etc. One or more additional sensors may be included in and/or communicatively coupled to a sensor subsystem 710 of the in-vehicle computing system 700. For example, the sensor subsystem 710 may include and/or be communicatively coupled to a camera, such as a rear view camera for assisting a user in parking the vehicle, a cabin camera for identifying a user, and/or a front view camera to assess quality of the route segment ahead. The above-described cameras may also be used to provide images to a computer vision-based traffic sign detection module, as described above. Sensor subsystem 710 of in-vehicle computing system 700 may communicate with and receive inputs from various vehicle sensors and may further receive user inputs. While certain vehicle system sensors may communicate with sensor subsystem 710 alone, other sensors may communicate with both sensor subsystem 710 and vehicle control system 730, or may communicate with sensor subsystem 710 indirectly via vehicle control system 730. Sensor subsystem 710 may serve as an interface (e.g., a hardware interface) and/or processing unit for receiving and/or processing received signals from one or more of the sensors described in the disclosure.

A navigation subsystem 711 of in-vehicle computing system 700 may generate and/or receive navigation information such as location information (e.g., via a GPS sensor and/or other sensors from sensor subsystem 710), route guidance, traffic information, point-of-interest (POI) identification, and/or provide other navigational services for the driver. The navigation subsystem 711 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 711 may communicate with motion and rotation sensors included in the sensor subsystem 710. Alternatively, the navigation subsystem 711 may include motion and rotation sensors and determine the movement and rotation based on the output of these sensors. Navigation subsystem 711 may transmit data to, and receive data from a cloud-based server and/or external navigation service via extra-vehicle communication module 724.

An external device interface 712 of in-vehicle computing system 700 may be coupleable to and/or communicate with one or more external devices 740 located external to vehicle 701. While the external devices are illustrated as being located external to vehicle 701, it is to be understood that they may be temporarily housed in vehicle 701, such as when the user is operating the external devices while operating vehicle 701. In other words, the external devices 740 are not integral to vehicle 701. The external devices 740 may include a mobile device 742 (e.g., connected via a Bluetooth, NFC, WIFI direct, or other wireless connection) or an alternate Bluetooth-enabled device 752. Mobile device 742 may be a mobile phone, smart phone, wearable devices/sensors that may communicate with the in-vehicle computing system via wired and/or wireless communication, or other portable electronic device(s). Other external devices include external services 746. For example, the external devices may include extra-vehicular devices that are separate from and located externally to the vehicle. Still other external devices include external storage devices 754, such as solid-state drives, pen drives, USB drives, etc. External devices 740 may communicate with in-vehicle computing system 700 either wirelessly or via connectors without departing from the scope of this disclosure. For example, external devices 740 may communicate with in-vehicle computing system 700 through the external device interface 712 over a network 760, a universal serial bus (USB) connection, a direct wired connection, a direct wireless connection, and/or other communication link.

One or more applications 744 may be operable on mobile device 742. As an example, mobile device application 744 may be operated to monitor an environment of the vehicle (e.g., collect audio and/or visual data of an environment of the vehicle) and/or to process audio and/or visual data received from vehicle sensors. The collected/processed data may be transferred by application 744 to external device interface 712 over network 760. Likewise, one or more applications 748 may be operable on external services 746. As an example, external services applications 748 may be operated to aggregate and/or analyze data from multiple data sources. For example, external services applications 748 may aggregate data from the in-vehicle computing system (e.g., sensor data, log files, user input, etc.), etc. The collected data may be transmitted to another device and/or analyzed by the application to determine a location of an emergency vehicle and/or to determine a suggested course of action for avoiding interference with the emergency vehicle.

Vehicle control system 730 may include controls for controlling aspects of various vehicle systems 731 involved in different in-vehicle functions. These may include, for example, controlling aspects of vehicle audio system 732 for providing audio output to the vehicle occupants. Audio system 732 may include one or more acoustic reproduction devices including electromagnetic transducers such as speakers. In some examples, the in-vehicle computing system may be the only audio source for the acoustic reproduction device or there may be other audio sources that are connected to the audio reproduction system (e.g., external devices such as a mobile phone) to produce audio outputs, such as one or more of the audible alerts described above. The connection of any such external devices to the audio reproduction device may be analog, digital, or any combination of analog and digital technologies.

Vehicle control system 730 may also include controls for adjusting the settings of various vehicle control elements 761 (or vehicle controls, or vehicle system control elements) related to the engine and/or auxiliary elements within a cabin of the vehicle, such as steering controls 762, brake controls 763, and/or lighting controls 764 (e.g., cabin lighting, external vehicle lighting, light signals). For example, the vehicle control system 730 may include controls for adjusting the vehicle control elements 761 to present one or more of the above-described alerts (e.g., adjusting cabin lighting, automatically controlling steering or braking to perform a maneuver in accordance with a detected traffic sign, etc.). Vehicle control elements 761 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system (e.g., to provide the above-described alert). The control signals may also control audio output (e.g., an audible alert) at one or more speakers of the vehicle's audio system 732.

In-vehicle computing system 700 may further include an antenna(s) 706, which may be communicatively coupled to external device interface 712 and/or extra-vehicle communication module 724. The in-vehicle computing system may receive positioning signals such as GPS signals and/or wireless commands via antenna(s) 706 or via infrared or other mechanisms through appropriate receiving devices.

One or more elements of the in-vehicle computing system 700 may be controlled by a user via user interface 718. User interface 718 may include a graphical user interface presented on a touch screen, such as touch screen 608 of FIG. 6, and/or user-actuated buttons, switches, knobs, dials, sliders, etc. A user may also interact with one or more applications of the in-vehicle computing system 700 and mobile device 742 via user interface 718. Notifications and other messages (e.g., alerts), as well as navigational assistance, may be displayed to the user on a display of the user interface. User preferences/information and/or responses to presented alerts may be performed via user input to the user interface.

The disclosure provides for a traffic sign detection system in a vehicle, the traffic sign detection system including an image sensor, a communication system, a processor, and a storage device storing instructions executable by the processor to capture an image of an environment of the vehicle via the image sensor, process the image to detect visual information regarding a traffic sign in the image, the visual information indicating a recognized sign, receive cryptographic data via the communication system from a transmitter associated with the traffic sign, the cryptographic data including a cryptographic representation of a traffic sign signal for controlling the traffic sign, and selectively control one or more vehicle systems of the vehicle based on a cryptographic verification of the recognized sign using the cryptographic data. In a first example of the system, the cryptographic representation of the traffic sign signal may additionally or alternatively include a unique ID associated with the traffic sign that is encrypted using a first public key. A second example of the system optionally includes the first example, and further includes the system, wherein the cryptographic representation of the traffic sign signal is digitally signed using a first private key that is only accessible by the transmitter associated with the traffic sign. A third example of the system optionally includes one or both of the first example and the second example, and further includes the system, wherein the cryptographic verification of the recognized sign further includes decrypting the cryptographic data using a second private key that is only accessible by the processor. A fourth example of the system optionally includes one or more of the first through the third examples, and further includes the system, wherein the second private key is stored in a replay protected memory block of the storage device. A fifth example of the system optionally includes one or more of the first through the fourth examples, and further includes the system, wherein the cryptographic verification of the recognized sign further includes performing a verification of a digital signature of the cryptographic data using a second public key. A sixth example of the system optionally includes one or more of the first through the fifth examples, and further includes the system, wherein the recognized sign is determined to be cryptographically verified responsive to successfully decrypting the cryptographic data to retrieve the unique ID using the second private key corresponding to the recognized sign. A seventh example of the system optionally includes one or more of the first through the sixth examples, and further includes the system, wherein the second private key is retrieved based on an association of the second private key with a stored ID that is stored locally to the vehicle and that corresponds to the recognized sign, wherein the recognized sign is only determined to be cryptographically verified further responsive to determining that the unique ID retrieved via decrypting the cryptographic data with the second private key is the same as the stored ID associated with the recognized sign. An eighth example of the system optionally includes one or more of the first through the seventh examples, and further includes the system, wherein selectively controlling one or more vehicle systems of the vehicle based on the cryptographic verification of the recognized sign comprises adjusting operation of the vehicle to adhere to a regulation associated with the recognized sign responsive to determining that the recognized sign is cryptographically verified and not adjusting operation of the vehicle based on the recognized sign responsive to determining that the recognized sign is not cryptographically verified. A ninth example of the system optionally includes one or more of the first through the eighth examples, and further includes the system, wherein processing the image to detect the traffic sign in the image comprises utilizing one or more deep learning algorithms. A tenth example of the system optionally includes one or more of the first through the ninth examples, and further includes the system, wherein the cryptographic data is broadcast wirelessly from an antenna associated with the traffic sign.

The disclosure also provides for a method of verifying traffic signs with a vehicle, the method including capturing an image of an environment of the vehicle via an image sensor, processing the image to detect visual information regarding a traffic sign in the image, the visual information indicating a recognized sign, receiving cryptographic data via the communication system from a transmitter associated with the traffic sign, the cryptographic data including a cryptographic representation of an authorized sign output associated with the traffic sign, and selectively controlling one or more vehicle systems of the vehicle based on a cryptographic verification of the recognized sign using the cryptographic data. In a first example of the method, the cryptographic representation of the authorized sign output may additionally or alternatively comprise a unique ID associated with the traffic sign, the unique ID being one of a plurality of unique IDs generated via a true random number generator for assignment to a plurality of unique IDs associated with a plurality of traffic signs, each of the plurality of unique IDs being stored in a traffic sign database in association with a respective traffic sign. A second example of the method optionally includes the first example, and further includes the method, wherein the cryptographic data includes an encryption of the unique ID, which is encrypted using a first public key of an encryption algorithm. A third example of the method optionally includes one or both of the first example and the second example, and further includes the method, wherein the cryptographic data further includes an assembly of the encryption of the unique ID with a digital signature, the digital signature being generated by applying a cryptographic signature algorithm on the encryption of the unique ID using a first private key. A fourth example of the method optionally includes one or more of the first through the third examples, and further includes the method, wherein the cryptographic verification of the recognized sign further includes performing a signature verification on the cryptographic data using a second public key of the encryption algorithm and decrypting the cryptographic data using a second private key that is only accessible by the processor. A fifth example of the method optionally includes one or more of the first through the fourth examples, and further includes the method, further comprising retrieving the second public key from an integrity check storage of the vehicle. A sixth example of the method optionally includes one or more of the first through the fifth examples, and further includes the method, wherein the recognized sign is determined to be cryptographically verified responsive to successfully decrypting the cryptographic data to retrieve the unique ID using the second private key corresponding to the recognized sign, and successfully verifying a signature of the digital signal of the cryptographic data using the second public key. A seventh example of the method optionally includes one or more of the first through the sixth examples, and further includes the method, wherein selectively controlling one or more vehicle systems of the vehicle based on the cryptographic verification of the recognized sign comprises adjusting operation of the vehicle to adhere to a regulation associated with the recognized sign responsive to determining that the recognized sign is cryptographically verified and not adjusting operation of the vehicle based on the recognized sign responsive to determining that the recognized sign is not cryptographically verified.

The disclosure also provides for a method of verifying external informational images in a vehicle's environment, the method including analyzing an external informational image including electronically displayed information received at the vehicle to identify the electronically displayed information from a display source and generate a characteristic field, comparing the characteristic field to cryptographic data received at the vehicle from the display source, and selectively controlling one or more vehicle systems of the vehicle based on the comparison. In a first example of the method, the characteristic field may additionally or alternatively include a representation of the electronically displayed information, the representation of the electronically displayed information taking the form of: a character field including characters associated with or included in the electronically displayed information, and/or a simplified version of an image corresponding to the electronically displayed information. A second example of the method optionally includes the first example, and further includes the method, wherein the cryptographic data includes cryptographically-secured information including characters of the electronically displayed information, a subset of characters of the electronically displayed information, and/or a simplified version of an image of the electronically displayed information. A third example of the method optionally includes one or both of the first example and the second example, and further includes the method, wherein comparing the characteristic field to cryptographic data received at the vehicle further includes decrypting the cryptographic data using a key that is retrieved based on the characteristic field and determining if resulting decrypted data matches the characteristic field. A fourth example of the method optionally includes one or more of the first through the third examples, and further includes the method, wherein selectively controlling one or more vehicle systems based on the comparison includes controlling the one or more vehicle systems to adhere to a regulation associated with the electronically displayed information responsive to determining that the characteristic field matches the resulting decrypted data.

In another representation, a traffic sign detection system in a vehicle may include an image sensor, a communication system, a processor comprising a computer vision-based traffic sign recognition module and a cryptography-based traffic sign verification module, and a storage device storing instructions executable by the processor to capture an image of an environment of the vehicle via the image sensor, process, via the computer vision-based traffic sign recognition module, the image to detect visual information regarding a traffic sign in the image, the visual information indicating a recognized sign, receive cryptographic data via the communication system, the cryptographic data including a cryptographic representation of a traffic sign signal for traffic sign, decrypt, using the cryptography-based traffic sign verification module, the cryptographic data based on the recognized sign to identify a unique ID of the traffic sign, determine whether the cryptographic data is decrypted using a key that is selected based on the recognized sign, adjust operation of the vehicle based on the first traffic sign when the cryptographic data is successfully decrypted using the key, and transmit or display a warning indicating a faked traffic sign when the cryptographic data is not able to be decrypted using the key.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 609 and/or in-vehicle computing system 700 described with reference to FIGS. 6 and 7. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A traffic sign detection system in a vehicle, the traffic sign detection system comprising:
an image sensor;
a communication system;
a processor; and
a storage device storing instructions executable by the processor to:
capture an image of an environment of the vehicle via the image sensor;
process the image to detect visual information regarding a traffic sign in the image, the visual information indicating a recognized sign;
receive cryptographic data via the communication system from a transmitter associated with the traffic sign, the cryptographic data including a cryptographic representation of a traffic sign signal for controlling the traffic sign; and
selectively control one or more vehicle systems of the vehicle based on a cryptographic verification of the recognized sign using the cryptographic data.

2. The traffic sign detection system of claim 1, wherein the cryptographic representation of the traffic sign signal includes a unique ID associated with the traffic sign that is encrypted using a first public key.

3. The traffic sign detection system of claim 2, wherein the cryptographic representation of the traffic sign signal is digitally signed using a first private key that is only accessible by the transmitter associated with the traffic sign.

4. The traffic sign detection system of claim 2, wherein the cryptographic verification of the recognized sign further includes decrypting the cryptographic data using a second private key that is only accessible by the processor.

5. The traffic sign detection system of claim 4, wherein the second private key is stored in a replay protected memory block of the storage device and wherein the cryptographic data is broadcast wirelessly from an antenna associated with the traffic sign.

6. The traffic sign detection system of claim 3, wherein the cryptographic verification of the recognized sign further includes performing a verification of a digital signature of the cryptographic data using a second public key and wherein processing the image to detect visual information regarding the traffic sign in the image comprises utilizing one or more deep learning algorithms.

7. The traffic sign detection system of claim 2, wherein the recognized sign is determined to be cryptographically verified responsive to successfully decrypting the cryptographic data to retrieve the unique ID using a second private key corresponding to the recognized sign.

8. The traffic sign detection system of claim 7, wherein the second private key is retrieved based on an association of the second private key with a stored ID that is stored locally to the vehicle and that corresponds to the recognized sign, wherein the recognized sign is only determined to be cryptographically verified further responsive to determining that the unique ID retrieved via decrypting the cryptographic data with the second private key is the same as the stored ID associated with the recognized sign.

9. The traffic sign detection system of claim 1, wherein selectively controlling one or more vehicle systems of the vehicle based on the cryptographic verification of the recognized sign comprises adjusting operation of the vehicle to adhere to a regulation associated with the recognized sign responsive to determining that the recognized sign is cryptographically verified and not adjusting operation of the vehicle based on the recognized sign responsive to determining that the recognized sign is not cryptographically verified.

10. A method of verifying traffic signs with a vehicle, the method comprising:
  capturing an image of an environment of the vehicle via an image sensor;
  processing the image to detect visual information regarding a traffic sign in the image, the visual information indicating a recognized sign;
  receiving cryptographic data via a communication system from a transmitter associated with the traffic sign, the cryptographic data including a cryptographic representation of an authorized sign output associated with the traffic sign; and
  selectively controlling one or more vehicle systems of the vehicle based on a cryptographic verification of the recognized sign using the cryptographic data.

11. The method of claim 10, wherein the cryptographic representation of the authorized sign output comprises a unique ID associated with the traffic sign, the unique ID being one of a plurality of unique IDs generated via a true random number generator for assignment to a plurality of unique IDs associated with a plurality of traffic signs.

12. The method of claim 11, wherein the cryptographic data includes an encryption of the unique ID, which is encrypted using a first public key of an encryption algorithm.

13. The method of claim 12, wherein the cryptographic data further includes an assembly of the encryption of the unique ID with a digital signature, the digital signature being generated by applying a cryptographic signature algorithm on the encryption of the unique ID using a first private key.

14. The method of claim 13, wherein the cryptographic verification of the recognized sign further includes performing a signature verification on the cryptographic data using a second public key of the encryption algorithm and decrypting the cryptographic data using a second private key.

15. The method of claim 14, further comprising retrieving the second public key from an integrity check storage of the vehicle, and wherein the recognized sign is determined to be cryptographically verified responsive to:
  successfully decrypting the cryptographic data to retrieve the unique ID using the second private key corresponding to the recognized sign, and
  successfully verifying a signature of the cryptographic data using the second public key.

16. The method of claim 15, wherein selectively controlling one or more vehicle systems of the vehicle based on the cryptographic verification of the recognized sign comprises adjusting operation of the vehicle to adhere to a regulation associated with the recognized sign responsive to determining that the recognized sign is cryptographically verified and not adjusting operation of the vehicle based on the recognized sign responsive to determining that the recognized sign is not cryptographically verified.

17. A method of verifying external informational images at a vehicle, the method comprising:
  analyzing an external informational image including electronically displayed information received at the vehicle to identify the electronically displayed information from a display source and generate a characteristic field;
  comparing the characteristic field to cryptographic data received at the vehicle from the display source; and
  selectively controlling one or more vehicle systems of the vehicle based on the comparison.

18. The method of claim 17, wherein the characteristic field includes a representation of the electronically displayed information, the representation of the electronically displayed information taking the form of at least one of:
  a character field including characters associated with or included in the electronically di splayed information, and
  a simplified version of an image corresponding to the electronically displayed information.

19. The method of claim 17, wherein the cryptographic data includes at least one of: cryptographically-secured information including characters of the electronically displayed information, a sub set of characters of the electronically di splayed information, and a simplified version of an image of the electronically displayed information; and wherein comparing the characteristic field to cryptographic data received at the vehicle further includes decrypting the cryptographic data using a key that is retrieved based on the characteristic field and determining if the decrypted data matches the characteristic field.

20. The method of claim 19, wherein selectively controlling one or more vehicle systems based on the comparison includes controlling the one or more vehicle systems to adhere to a regulation associated with the electronically displayed information responsive to determining that the characteristic field matches the decrypted data.

* * * * *

UNITED STATES PATENT AND TRADEMARK OFFICE
CERTIFICATE OF CORRECTION

PATENT NO. : 11,961,310 B2
APPLICATION NO. : 17/594597
DATED : April 16, 2024
INVENTOR(S) : Asadullah Ansari, Sharath Yadav Doddamane Hemantharaja and Jipin Jose Page 1 of 1

It is certified that error appears in the above-identified patent and that said Letters Patent is hereby corrected as shown below:

In the Claims

Column 26 In Claim 18:
On Line 41, correct "in the electronically di splayed information" to "in the electronically displayed information"

Column 26 In Claim 19:
On Line 49, correct "of the electronically di splayed information" to "of the electronically displayed information"

Signed and Sealed this
Seventh Day of January, 2025

Derrick Brent
*Acting Director of the United States Patent and Trademark Office*